United States Patent
Lee et al.

(10) Patent No.: US 10,458,843 B2
(45) Date of Patent: Oct. 29, 2019

(54) SPECTROMETRY APPARATUS AND SPECTROMETRY METHOD

(71) Applicant: GWANGJU INSTITUTE OF SCIENCE AND TECHNOLOGY, Buk-gu, Gwangju (KR)

(72) Inventors: Heung No Lee, Gwangju (KR); James Oliver, Gwangju (KR); Woong Bi Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 273 days.

(21) Appl. No.: 14/434,757

(22) PCT Filed: Oct. 8, 2013

(86) PCT No.: PCT/KR2013/009014
§ 371 (c)(1),
(2) Date: Apr. 9, 2015

(87) PCT Pub. No.: WO2014/058225
PCT Pub. Date: Apr. 17, 2014

(65) Prior Publication Data
US 2015/0285677 A1 Oct. 8, 2015

(30) Foreign Application Priority Data
Oct. 10, 2012 (KR) .................. 10-2012-0112453

(51) Int. Cl.
*G01J 3/02* (2006.01)
*G01J 3/12* (2006.01)
(Continued)

(52) U.S. Cl.
CPC ............... *G01J 3/0205* (2013.01); *G01J 3/28* (2013.01); *G01J 3/2803* (2013.01); *G01J 3/36* (2013.01);
(Continued)

(58) Field of Classification Search
CPC .... G01J 3/26; G01J 3/36; G01J 3/0208; G01J 3/2823; G01J 3/44; G01J 3/0256;
(Continued)

(56) References Cited

U.S. PATENT DOCUMENTS 6,809,859 B2 * 10/2004 Erdogan ................ G02B 5/285
359/359
7,360,873 B2 * 4/2008 Sekiya ................ B41J 2/17509
347/66
(Continued)

FOREIGN PATENT DOCUMENTS

JP 08-285685 A 11/1996
JP 2006523847 A 10/2006
(Continued)

OTHER PUBLICATIONS

Oliver et al, "Improving resolution of miniature spectrometers by exploiting sparse nature of signals", Optics Express vol. 20, No. 3, Jan. 30, 2012, pp. 2613-2625.
(Continued)

*Primary Examiner* — Chikaodili E Anyikire
*Assistant Examiner* — Kehinde Abimbola
(74) *Attorney, Agent, or Firm* — Loza & Loza, LLP; Heidi L. Eisenhut (57) ABSTRACT

According to the present invention a spectrometry apparatus includes: an optical filter device in which two or more filters are provided to filter incident light; an optical sensor device in which two or more optical sensors are provided to be capable of corresponding to the two or more filters so as to
(Continued)

convert the filtered light into a charge to be outputted; and a digital signal processing unit that performs digital signal processing on an output signal of the optical sensor device to recover spectrum data on the incident light, and having at least one of the two or more filters being a random transmittance filter. According to the present invention, the resolution of the recovered optical signal is improved and recovery accuracy is improved.

18 Claims, 10 Drawing Sheets (51) Int. Cl.
G01J 3/28 (2006.01)
G01J 3/36 (2006.01)
H04N 5/33 (2006.01)
H04N 5/335 (2011.01)

(52) U.S. Cl.
CPC ............ *H04N 5/332* (2013.01); *H04N 5/335* (2013.01); *G01J 2003/1213* (2013.01); *G01J 2003/1217* (2013.01)

(58) Field of Classification Search
CPC .... G01J 3/2803; G01J 3/51; G01J 3/02; G01J 3/0205; G01J 3/027; G01J 3/0291; G01J 3/0272; G01J 3/0264; G01J 3/0259; G01J 3/0218; G01J 3/0229
See application file for complete search history.

(56) References Cited

U.S. PATENT DOCUMENTS

| | | | | |
|---|---|---|---|---|
| 7,411,679 | B2* | 8/2008 | Erdogan | G02B 5/285 356/417 |
| 8,472,019 | B2* | 6/2013 | Seo | G01J 3/02 356/328 |
| 8,942,424 | B2* | 1/2015 | Chen | G06K 9/0063 382/103 |
| 9,068,889 | B2* | 6/2015 | Froigneux | G01J 3/02 |
| 9,184,902 | B2* | 11/2015 | Khojastepour | H04L 5/14 |
| 2003/0053501 | A1* | 3/2003 | Sekiya | H01S 5/18361 372/50.11 |
| 2004/0027652 | A1* | 2/2004 | Erdogan | G02B 5/285 359/359 |
| 2004/0207855 | A1 | 10/2004 | Brady et al. | |
| 2005/0110999 | A1* | 5/2005 | Erdogan | G02B 5/285 356/417 |
| 2005/0212672 | A1* | 9/2005 | Fry | G08B 21/0244 340/539.13 |
| 2006/0093010 | A1* | 5/2006 | Sekiya | H01S 5/18361 372/99 |
| 2008/0201140 | A1* | 8/2008 | Wells | G06F 17/30017 704/231 |
| 2008/0259318 | A1* | 10/2008 | Pan | G01J 3/02 356/73 |
| 2009/0202120 | A1* | 8/2009 | Otsuka | G01J 3/32 382/128 |
| 2009/0231421 | A1* | 9/2009 | Arai | A61K 49/006 348/79 |
| 2011/0222056 | A1* | 9/2011 | Seo | G01J 3/02 356/303 |
| 2011/0299104 | A1 | 12/2011 | Seo et al. | |
| 2012/0105847 | A1 | 5/2012 | Kerstan | |
| 2013/0271760 | A1* | 10/2013 | Froigneux | G01J 3/02 356/301 |
| 2013/0286903 | A1* | 10/2013 | Khojastepour | H04L 5/14 370/280 |
| 2014/0029793 | A1* | 1/2014 | Chen | G06K 9/0063 382/103 |

FOREIGN PATENT DOCUMENTS

| | | |
|---|---|---|
| JP | 2008-191097 A | 8/2008 |
| JP | 2008191097 A | 8/2008 |
| JP | 2008191547 A | 8/2008 |
| JP | 2010256324 A | 11/2010 |
| JP | 2012058177 A | 3/2012 |
| KR | 10-2005-0077695 A | 8/2005 |
| KR | 20140011829 A | 1/2014 |
| WO | 2007/077841 A1 | 7/2007 |
| WO | 2012-040466 A2 | 3/2012 |

OTHER PUBLICATIONS

Office Action for Japanese Patent Application No. 2015-536712 dated Feb. 6, 2016; 2 pages.

* cited by examiner

SPECTROMETRY APPARATUS AND SPECTROMETRY METHOD

TECHNICAL FIELD

The present invention relates to a spectroscopic apparatus and a spectroscopic method, and more particularly to a spectroscopic apparatus and a spectroscopic method, in which resolution can be improved and the accuracy of a spectrum can be enhanced in a spectroscopic apparatus employing an optical filter.

BACKGROUND ART

A spectroscopic apparatus has been used as a core mechanism in various industrial fields such as optical fields, chemical fields, and marine engineering fields. The spectroscopic apparatus measures intensities of a variety of wavelengths generated from an object and represents the measurement information in the form of a graph or a spectrum. A degree at which the spectroscopic apparatus accurately and finely represents the information of the object is called "resolution". The resolution is an important factor to evaluate the performance of a spectroscope.

Among spectroscopic apparatuses, a miniature spectroscopic apparatus, which employs a filter device to reduce the manufacturing cost, can be conveniently used for a portable purpose. The filter device can be intensively produced by densely arranging filters.

A filter device technology employing nano-processes is used to micro-miniaturize the spectroscopic apparatus in size and to significantly save the production price of the spectroscopic apparatus in mass-production resulting from the micro-miniaturization. The miniature spectroscopic apparatus produced through such a process greatly helps to measure the characteristics of a material in an industrial site outside a laboratory. In addition, the spectroscopic apparatus can be easily connected with a computer or other electronic devices and used together. In addition, the spectroscopic apparatus based on a filter device can measure the spectrum information of a light source within a short period of time.

The limitation of the resolution that can be reached by the spectroscopic apparatus may be determined depending on the number of filters provided in the optical filter device. Accordingly, in order to enhance the resolution, the increase in the number of the filters may be taken into consideration. However, it may be actually difficult to increase the number of the filters provided in the optical filter device due to a physical restriction condition and spectrum distortion.

There may be a transmittance function of an optical filter as another factor to determine the resolution. Actually, since the transmittance function of the optical filter is non-ideal in a low-cost nano-process filter device, the non-ideal optical filter distorts original spectrum information of an optical signal. Accordingly, in order to find the original spectrum information of the optical signal, it is necessary to perform digital signal processing with respect to spectral components of an input signal.

As representative digital signal processing schemes, there has been introduced non-patent document 1, J. Oliver, W. B. Lee, S. J. Park, H. N. Lee, "improving resolution of miniature spectrometers by exploiting sparse nature of signals," Opt. Exp. 20, 2613-2625 (2012)), and patent document 1, Korean Patent Application No. 10-2012-0079171. The patent document 1 is filed for the invention invented by an inventor of the present invention and provides an L1 norm minimization algorithm realized to find original spectrum information of an optical signal. However, the technologies provided in the above documents have a limitation in enhancing the resolution. Accordingly, the increase in the number of filters provided in the optical filter device must be inevitably taken into consideration.

Technical Problem

The inventor of the present invention aims at the realization of a method capable of improving the resolution of a spectroscopic apparatus using a digital signal processing device, and suggests a spectroscopic apparatus and a spectroscopic method, capable of improving the accuracy of a spectrum.

Technical Solution

According to a first invention, there may be provided a spectroscopic apparatus including an optical filter device including at least two filters to filter incident light, an optical sensor device including at least two optical sensors corresponding to the at least two filters to convert the filtered light into a charge and to output the charge, and a digital signal processing unit that digitally processes an output signal from the optical sensor device to recover spectrum information of the incident light. At least one of the at least two filters may be a random transmittance filter.

According to the first invention, the transmittance of the random transmittance filter may have a random peak value throughout a whole target wavelength band, rapidly vary, and have at least three peak values. The random transmittance filter may be a substrate provided therein with a plurality of elongated grooves spaced apart from each other, the elongated grooves may serve as a diffraction lattice, 500 to 1000 elongated grooves may be provided at an interval of 1 mm, and the transmittance of the random transmittance filter may be adjusted according to wavelengths as a cycle and a height of the elongated grooves vary. In addition, a thin dielectric layer may be laminated on the random transmittance filter. Meanwhile, the digital signal processing unit may perform signal processing based on an L1 norm minimization algorithm employing a sparse nature of a signal. In addition, the random transmittance filter may have a low autocorrelation function.

According to a second invention, there may be provided a spectroscopic method including filtering incident light by each of at least two filters, and converting the light filtered by each of the at least two filters into an electrical signal by using an optical sensor device to output the electrical signal. The light passing through at least one of the at least two filters is randomly filtered in the filtering of the incident light by each of the at least two filters.

According to the second invention, all lights passing through the at least two filters may be randomly filtered, digital signal processing may be performed based on an L1 norm minimization algorithm employing a sparse nature of a signal, and recovering spectrum information of the incident light may be further performed by performing digital signal processing with respect to an output of the optical sensor device.

According to a third invention, there may be provided a spectroscopic apparatus including an optical filter device including at least two filters to filter incident light, and an optical sensor device comprising at least two optical sensors corresponding to the at least two filters to convert the filtered light into a charge and to output the charge. At least one of the at least two filters may be a random transmittance filter.

According to the third invention, the transmittance of the random transmittance filter may have a random peak value in at least a portion of a target wavelength band, have a random peak value in at least a portion of a target wavelength band, and have at least three peak values. The random transmittance filter may be provided the form of a substrate provided therein with a plurality of elongated grooves spaced apart from each other and may be provided by laminating a thin dielectric layer thereon.

Advantageous Effects

According to the present invention, the resolution of the spectroscopic apparatus can be improved, and the accuracy of the spectrum by the spectroscopic apparatus can be enhanced by improving a filter available for the digital signal processing device.

DETAILED DESCRIPTION

Figure 1:
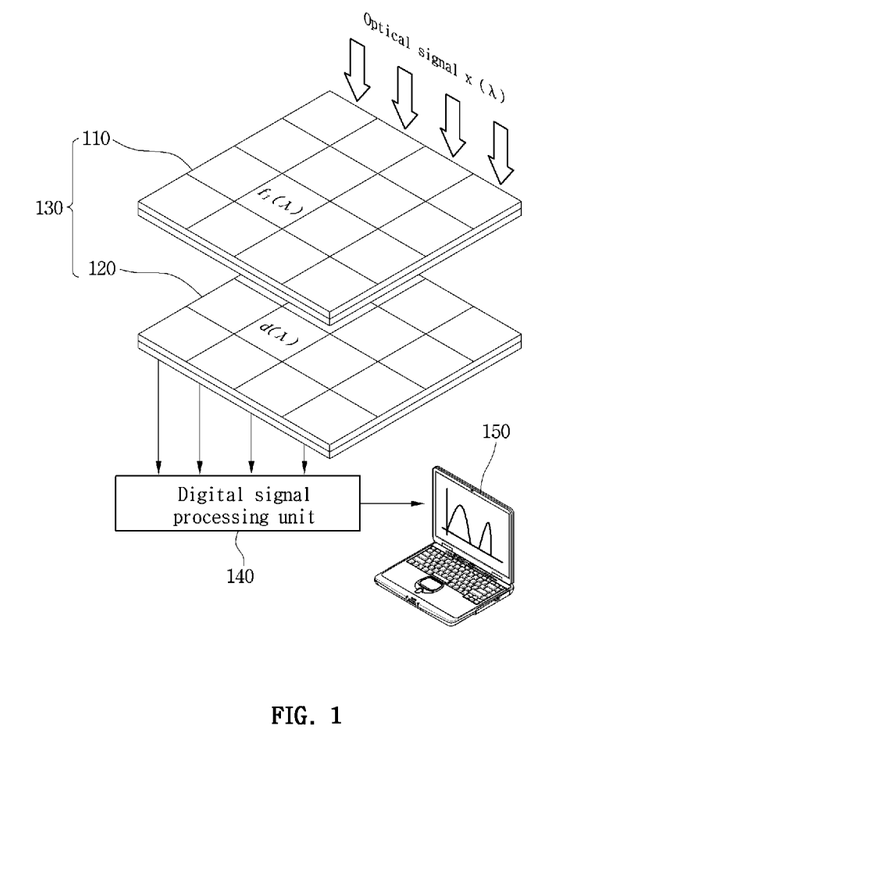
FIG. 1 is a view showing the structure of a spectroscopic apparatus according to the embodiment.

Hereinafter, the detailed embodiment of the present invention will be described in detail.
For the comprehension of the inventive concept of the present invention, the descriptions of the patent document 1 and the non-patent document 1 are involved in the following detailed description to the extent necessary. In addition, although a digital signal processing scheme disclosed in the patent document 1 is taken into consideration as one scheme adaptable to the present invention, the present invention can employ various digital signal processing schemes without the limitation to the digital signal processing scheme disclosed in the patent document 1.
FIG. 1 is a view showing the structure of a spectroscopic apparatus according to the embodiment.
Referring to FIG. 1, the spectroscopic apparatus according to the embodiment may include an optical filter device 110, an optical sensor device 120, a digital signal processing unit 140, and an analysis information providing unit 150.
The optical filter device 110 includes a set of filters having mutually different transmittance functions. The optical filter device 110, for example, may include M filters arranged in a two dimensional (2D) scheme. The drawing shows that 16 filters are provided for the illustrative purpose. At least one of the filters constituting the optical filter device 110 may preferably include a random transmittance filter, or all filters may include the random transmittance filter. The random transmittance filter refers to a filter representing transmittance having multiple peak values throughout a whole wavelength band for a spectrum, that is, a random transmittance function, differently from a non-ideal filter having a transmittance represented with only one or two peak values with respect to the whole wavelength band for the spectrum. For example, when the whole wavelength band for the spectrum is in the range of 400 nm to 800 nm, and the non-ideal filter is used, the transmittance function has a single peak value or two peak values at a specific point in the range of 400 nm to 800 nm and has a curve formed by smoothly linking the two peak values with each other (see FIG. 5). On the contrary, the filter having the random transmittance function represents a graph that sharply varies with numerous peak values throughout the whole wavelength band instead of the specific point in the range of 400 nm to 800 nm (see FIG. 4). In addition, the filter having the random transmittance function may have at least three random peak values throughout the whole wavelength band for the spectrum. The optical filter device 110 may be manufactured through a nano-process. The detailed configuration of the random transmittance filter will be described later.

The optical sensor device 120 is provided under the optical filter device 110 to convert filtered light into an electrical signal. The optical sensor device 120, for example, may include a charged coupled device (CCD). Filters of the optical filter device 110 are connected with components of the optical sensor device 120, respectively, so that an optical signal passing through the optical filter device 110 is converted in the form of charges by the optical sensor device 120. The configuration including the optical filter device 110 and the optical sensor device 120 may be called a miniature spectroscopic device 130 in a narrow sense. The output from the optical sensor device 120 may be input to the digital signal processing unit 140 to estimate an original spectrum of the optical signal.

The digital signal processing unit 140 performs a digital signal processing operation to recover original spectrum information from a distorted spectrum signal acquired from the optical filter device 110 and the optical sensor device 120. The digital signal processing unit 130 may be realized using a DSP chip.

The analysis information providing unit 150 provides the spectrum information of the optical signal recovered by the digital signal processing unit 140 in the form of a graph or other analysis information. For example, the analysis information providing unit 150 may be a micro-processor or a computer embedded therein with a software to provide the analysis information.

Figure 2:
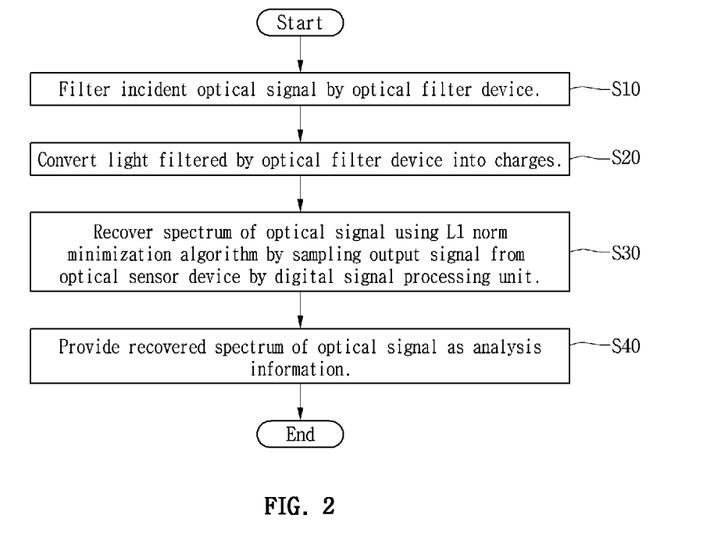
FIG. 2 is a flowchart to explain a spectroscopic method according to the embodiment.

FIG. 2 is a flowchart to explain a spectroscopic method according to the embodiment.

Referring to FIG. 2, the optical filter device 110 filters an incident optical signal (step S10). Each of the filters constituting the optical filter device 110 transmits only a specific wavelength component by a predetermined degree according to the transmittance of each wavelength allocated to the relevant filter. Accordingly, the spectrum information obtained from the optical filter device 110 may include a signal distorted due to the transmittance component of the optical filter, together with the original spectrum information of the optical signal.

Any one filter provided in the optical filter device 110 may be a random transmittance filter. All filters of the optical filter device 110 may include a random transmittance filter. In the light passing through the random transmittance filter, the whole wavelength band for the spectrum can be actually transmitted. As described in detail at the rear portion of the following description, the random transmittance filter may be configured to operate only with respect to any one portion of a wavelength band for the spectrum, and not to operate with respect to the other wavelength band. Although such a configuration does not exert a great influence on the operation of the invention, the configuration causes loss to the spectrum information, so that the number of filters provided in the optical filter device 110 may be increased.

The optical sensor device 120 converts the light filtered by the optical filter device 110 into charges (step S20). In this case, the light passing through any one random transmittance filter provided in the optical filter device 110 can be converted into a quantity of a single charge regardless of the wavelength of the light passing through the random transmittance filter.

The digital signal processing unit 140 recovers the spectrum of the optical signal using the L1 norm minimization algorithm by sampling the output signal from the optical sensor device 120 (step S30). Thereafter, the recovered spectrum of the optical signal is provided as analysis information (step S40).

Hereinafter, one example of digital signal processing by the digital signal processing unit 140 will be described. Through the digital signal processing by the digital signal processing unit 140, a process of finding a solution of an insufficient linear equation is performed. The digital signal processing unit 140 performs the processor of finding the solution of the insufficient linear equation based on the L1 norm minimization algorithm. The processor of finding the solution of the insufficient linear equation based on the L1 norm minimization algorithm uses a nature that the spectrum information of the optical signal is sparsely distributed. The L1 norm minimization algorithm is an L1 norm minimization spectrum estimation algorithm using the sparse natures of signals.

Meanwhile, $x(\lambda)$ represents original spectral components of an optical signal incident to the optical filter device 110 at a wavelength ($\lambda$). Each element of the optical filter 110 may be specified in the form of a transmittance function. The transmittance function (transfer function) is a measurement value of the fraction of light allowed at the wavelength ($\lambda$) to which a filter is allocated.

In this case, $f_i(\lambda)$ represents a transfer function of an $i^{th}$ element of the filter device.

In addition, $d(\lambda)$ represents a sensitivity function of the optical sensor device 120 under all elements have the same sensitivity function. In addition, $D_i(\lambda_j)$ (where, i=1, 2, . . . , M) represents $i^{th}$ sensitivity of the optical sensor device 120 at the wavelength ($\lambda$) given by $D_i(\lambda)=d(\lambda)f_i(\lambda)$.

Then, an $i^{th}$ output $y_i$ of the optical sensor device 120 is given as $y_i=\int D_i(\lambda)x(\lambda)d\lambda+w_i$, wherein the $w_i$ represents observation noise or measurement noise.

All M samples are collected from the outputs of the optical sensor device 120 and may be arranged in the form of a vector $y=[y_1, \ldots, y_M]^T$.

The output signal of the optical sensor device 120 may be expressed as the output vector y. The output vector y may be modeled using a linear equation as expressed in Equation 1.

$$y=Dx+w \qquad \text{Equation 1}$$

In Equation 1, D represents a sensitivity matrix of M×N of the optical sensor device 120 as expressed in Equation 2.

$$\begin{bmatrix} D_1(\lambda_1) & D_1(\lambda_2) & \cdots & D_1(\lambda_N) \\ D_2(\lambda_1) & D_2(\lambda_2) & \cdots & D_2(\lambda_N) \\ \vdots & \vdots & \ddots & \vdots \\ D_M(\lambda_1) & D_M(\lambda_2) & \cdots & D_M(\lambda_N) \end{bmatrix} \qquad \text{Equation 2}$$

Each component of an M×1 vector w may be modeled using a Gaussian random variable having a zero-mean and a variance $\sigma^2$.

In addition, $x=[x_1, x_2, \ldots, x_N]^T$ represents a signal spectrum vector obtained by uniformly sampling a continuous signal spectrum $x(\lambda)$ at wavelengths $\lambda_1, \lambda_2, \ldots, \lambda_N$.

In addition, $W_\lambda$ represents the total bandwidth of a signal x for the spectrum.

In addition, $$\Delta\lambda_N = \frac{W_\lambda}{N}$$

represents the interval between the samples of the signal x

Further, $D_i(\lambda_j)$ in Equation 2 may be obtained by uniformly sampling the ith sensitivity function of the optical sensor device 120 along a wavelength axis.

In addition, the matrix D may have a high conditional number because non-ideal transfer functions form rows of the matrix D associated with each other.

In the state that the sensitivity matrix D of the optical sensor device 120 is given, an estimation $\hat{x}$ of the signal spectrum x must be solved from the output signal y.

The recovery accuracy of the signal spectrum estimation may be measured in terms of a mean square error (MSE) defined as expresses in Equation 3.

$$MSE = \frac{1}{N}\sum_{i=1}^{N}(x_i - \hat{x}_i)^2 \qquad \text{Equation 3}$$

In Equation 3, $x_i$ represents an $i^{th}$ component of the signal x.

On the assumption that there is no noise, Equation 1 becomes a sufficient equation if M≥N, and becomes an insufficient equation if M<N.

The resolution of the miniature spectroscopic apparatus is determined depending on a capability to identify spatially close spectral components. When the interval is given as $$\Delta\lambda_N = \frac{W_\lambda}{N},$$

the maximum possible resolution of the spectroscopic apparatus may be defined as $$\Delta\lambda_{max} = \mu_N\Delta\lambda_N = \mu_N\frac{W_\lambda}{N}.$$

In this case, $\mu_N$ is given as expressed in Equation 4.

$$\mu_N := \min_{\mu \in \{1,2,\ldots,N-1\}} \mu \text{ subject to } MSE \le \delta, \quad \text{Equation 4}$$

In this case, δ>0 is a user-defined positive number.

If the MSE between the recovered signal spectrum and the input signal spectrum is equal to or less than δ, the $\mu_N \Delta \lambda_N$ of two spectrums spaced apart from each other may be decomposed. Since the interval between the samples is given as $$\Delta \lambda_N = \frac{W_\lambda}{N}$$

with respect to the fixed bandwidth $W_\lambda$, if the value of N is increased, the value of the interval $\Delta \lambda_N$ may be decreased. Accordingly, in order to find the maximum possible resolution, the value of the N must be increased.

When μ=1, it is necessary to check whether there is two continuous non-zero spectral components of x spaced apart from each other at the interval of $\Delta \lambda_N$ and separately decomposed.

When $\mu_N$=2, there is no pair of spectral components spaced apart from each other at the interval of $\Delta \lambda_N$, and there are several pairs of non-zero spectral components separately decomposed from each other and spaced apart from each other at an interval of $2\Delta \lambda_N$.

In Equation 1, a predetermined natural signal or vector x may be expressed as being directly sparse or sparse on a certain basis, that is, x=Ψs. The basis Ψ is an N×N matrix called a sparse based matrix. A signal s has K-sparse components. In other words, K components of the signal s are non-zero, and remaining N-K components of the signal s are zero. Therefore, a natural signal is obtained by simply linearly combining K rows of the matrix Ψ with each other. In this case, when Ψ=I, Ψ is a self matrix. When x=s, the signal x is called a directly sparse signal, which is originally sparse.

Therefore, the original signal spectrum x may be modeled through the linear combination of K (Gaussian kernel) in Equation 1. In other words, the original signal spectrum x m may be modeled as x=Ψs. The Gaussian kernel may be used because a smooth Gaussian kernel can conserve the smooth characteristic of a general signal spectrum. The Gaussian kernel may not be essentially used. If a signal spectrum has the form of a pulse, a different model may be naturally employed.

In addition, although the specifications of the Gaussian kernel require only two parameters, that is, a position and a width, the specifications of the Gaussian kernel may be selected according to the characteristics of a signal spectrum in a specific field. In order to form the kernel matrix Ψ, a single Gaussian kernel having a predetermined full-width at half maximum (FWHM) is sampled. The sampled kernel constitutes a first column of the kernel matrix Ψ. The remaining N−1 columns of the kernel matrix Ψ may be obtained by shifting the first column. The interval between samples of the Gaussian kernel is $\Delta \lambda_N$.

When the sparse model x=Ψs is used, Equation 1 may be expressed as shown in Equation 5.

$$y = Dx + w = D\Psi s + w \quad \text{Equation 5}$$

The output signal has M×1 dimensions. The dimension of the D is M×N, M<N, and the dimension of the signal s is N×1. In Equation 1, the estimation value ŝ of the signal s can be acquired from the output signal y. It should be noted that the dimension of the output signal y is lower than the dimension of the sparse signal. After sparse expression, an L1 norm criterion may be employed in order to recover the original sparse signal from the measurement vector y.

The L1 norm minimization algorithm is to improve the quality (resolution) of the recovered signal, which is given, by observing a fixed number of signals using previous information of the signals. After the sparse expression has been made, the sparse signal s is originally recovered from the output signal y.

As only M (<N) original spectrum measurement values are given, N unknown variables shown in Equation 5 may be estimated. In order to find unique and sparse solutions for the insufficient system of the linear equation, the L1 norm minimization scheme may be used.

The signal model of y=DΨs+w is used. In this case, the signal s includes K sparse signals. The strongest scheme to recover the signal s is to find the sparse vector s matched with the measurement value y by solving an L0 norm minimization problem as expressed in Equation 6.

$$\hat{s} = \min_s \|s\|_0 \text{ subject to } \|D\Psi s - y\|_2^2 \le \varepsilon \quad \text{Equation 6}$$

In this case, an $\|s\|_0$ operator counts the number of non-zero components of the signal s, and ε is a small positive integer specified by a user.

However, Equation 6 relates to a combinational optimization problem that may not be handled through a computer operation. Accordingly, the L1 norm minimization algorithm can provide a solution that can be easily handled with respect to the problem of Equation 6.

The L1 norm minimization algorithm of the digital processing unit 130 to recover the sparse signal may be expressed as shown in Equation 7.

$$\hat{s} = \min_s \|s\|_1 \text{ subject to } \|D\Psi s - y\|_2^2 \le \varepsilon \quad \text{Equation 7}$$

In order to find the optimal estimation value ŝ, the L1 norm minimization can be reconfigured through a linear program capable of effectively finding solutions normally. If A=DΨ, Equation 7 may be changed to Equation 8.

$$\min_s \|s\|_1 + \frac{\lambda}{2}\|y - As\|_2^2 \quad \text{Equation 8}$$

In Equation 8, λ is a non-negative parameter. In Equation 8, the minimization can be reconfigured through a linear programming problem having a non-negative number condition (s≥0). In this case, the non-negative number condition (s≥0) refers to that the signal spectrum is non-negative.

This can be expressed as Equation 9.

$$\min_s 1^T s \text{ subject to } \|As - y\|_2^2 \le \varepsilon, s \ge 0 \quad \text{Equation 9}$$

In order to estimate the optimal signal spectrum, an interior point method called primal-dual approach may be used to solve the linear programming problem of Equation 9.

Figure 3:
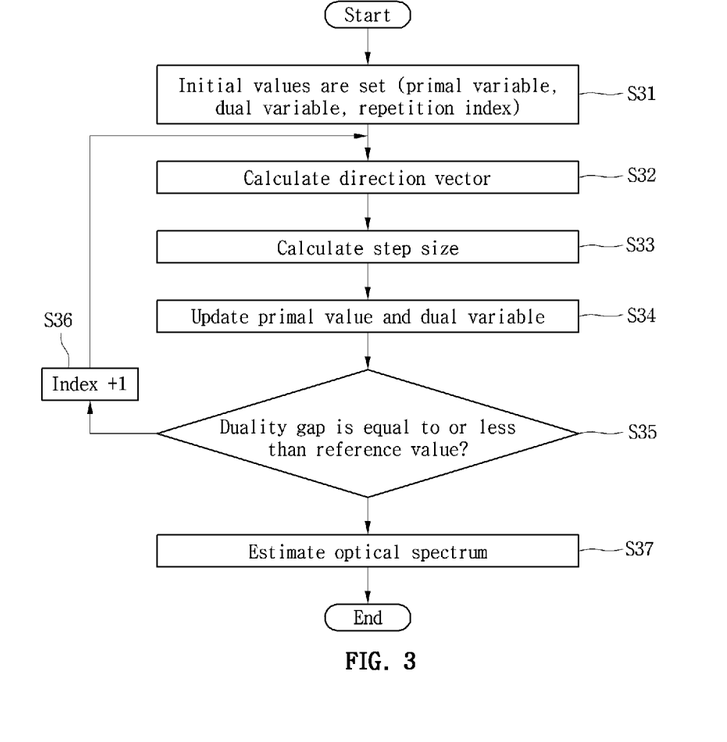
FIG. 3 is a flowchart to explain an L1 norm minimization algorithm according to the embodiment.

FIG. 3 is a flowchart to explain the L1 norm minimization algorithm according to the embodiment.

Referring to FIG. 3, initial values for the L1 norm minimization algorithm are set according to one embodiment (step S31). In the settings of the initial values, the initial values of a primal variable $s_\lambda^{(k)}$, a dual variable $v_\lambda^{(k)}$, a repetition index k, and a non-negative parameter $\lambda$ are set.

A directional vector is calculated (step S32). In this case, $(k-1)^{th}$ directional vectors $\Delta s_\lambda^{(k-1)}$, $\Delta v_\lambda^{(k-1)}$ are found through following Equation 10.

$$\Delta s_\lambda^{(k-1)} = [(S^{(k-1)})^{-1} V^{(k-1)} + \lambda A^T A]^{-1} [\lambda A^T (y - A s_\lambda^{(k-1)}) - 1_N]$$

$$\Delta v_\lambda^{(k-1)} = \lambda (A^T A \Delta s_\lambda^{(k-1)} - A^T (y - A s_\lambda^{(k-1)})) - s_\lambda^{(k-1)} + 1_N \quad \text{Equation 10}$$

In this case, $$S^{(k)} = \begin{bmatrix} s_{\lambda,1}^{(k)} & 0 & 0 \\ 0 & \ddots & 0 \\ 0 & 0 & s_{\lambda,N}^{(k)} \end{bmatrix}, V^{(k)} = \begin{bmatrix} v_{\lambda,1}^{(k)} & 0 & 0 \\ 0 & \ddots & 0 \\ 0 & 0 & v_{\lambda,N}^{(k)} \end{bmatrix},$$

$s_{\lambda,i}^{(k)}$ is an $i^{th}$ element of $s_\lambda^{(k)}$, and $v_{\lambda,j}^{(k)}$ is an $i^{th}$ element of $v_\lambda^{(k)}$. After finding the directional vector $\Delta s_\lambda^{(k-1)}$ of the primal variable, the directional vector $\Delta v_\lambda^{(k-1)}$ of the dual variable is found.

Thereafter, a step size is calculated (step S33). The step size may be calculated through a backtracking line search technology basically used in the optimal theory. In order to effectively estimate the step size, it is preferred that the step size is appropriately calculated. An initial step size is determined through Equation 11.

$$\alpha_0^{(k-1)} = 0.99 \cdot \min(\alpha_1, \alpha_2) \quad \text{Equation 11}$$

In Equation 11, $$\alpha_1 = \min_{i \in \{i: \Delta s_{\lambda,i}^{(k-1)} < 0\}} |s_{\lambda,i}^{(k-1)} / \Delta s_{\lambda,i}^{(k-1)}|, \text{ and}$$

$$\alpha_2 = \min_{i \in \{i: \Delta v_i^{(k)} < 0\}} |v_i^{(k-1)} / \Delta v_i^{(k-1)}|.$$

After determining the initial step size, the $(k-1)^{th}$ step size $\alpha^{(k-1)}$ to satisfy Equation 12 is obtained.

$$\|F_\lambda(s_\lambda^{(k-1)}, v_\lambda^{(k-1)})\|_2^2 > \|F_\lambda(s_\lambda^{(k-1)} + \alpha^{(k-1)} \Delta s_\lambda^{(k-1)}, v_\lambda^{(k-1)} + \alpha^{(k-1)} \Delta v_\lambda^{(k-1)})\|_2^2 \quad \text{Equation 12}$$

Next, the primal variable and the dual variable are updated (step S34). The $k^{th}$ primal variable and the $k^{th}$ dual variable are updated through Equation 13.

$$s_\lambda^{(k)} = s_\lambda^{(k-1)} + \alpha^{(k-1)} \Delta s_\lambda^{(k-1)}$$

$$v_\lambda^{(k)} = v_\lambda^{(k-1)} + \alpha^{(k-1)} \Delta v_\lambda^{(k-1)} \quad \text{Equation 13}$$

Next, it is determined if a duality gap is equal to or less than a reference value (step S35). The duality gap is expressed in following Equation 14.

$$\eta = |v^T(-s_\lambda)| \quad \text{Equation 14}$$

If the duality gap is greater than the reference value according to the determination result, +1 is added to an index, and $\lambda = \lambda \rho$ is performed (where, $\rho$ is a constant greater than 1) (step S36). Steps S32 and S34 are again repeated. If the duality gap is equal to or less than the reference value according to the determination result, an optical spectrum estimation value is output (step S37).

The optimal estimation value $\hat{S}$ can be found through the above procedure, and the original optical signal spectrum is recovered by using the estimation value.

Meanwhile, as described above, at least one of the filters of the optical filter device 110 may preferably include a random transmittance filter. The random transmittance filter may be a filter having multiple peak values throughout the whole target wavelength band, or in at least a portion of the target wavelength band. Preferably, the random transmittance filter may be a filter having multiple peak values throughout the whole target wavelength band. The random transmittance filter may be suggested as being lattice-based random transmittance filter, and being thin-film optical filter-based random transmittance filter.

First, the lattice-based random transmittance filter may be provided by providing a diffraction grid in the form of elongated grooves arranged at a random interval in a substrate. The transmittance of the input original optical signal can be controlled according to wavelengths by the cycle and the height of the diffraction grid. According to the embodiment, 500-1000 diffraction grids may be provided at the interval of 1 mm.

The thin-film optical filter-based random transmittance filter may be provided by laminating multiple thin dielectric layers having various thickness and various refractive indexes. In this case, light passing through the filter may have transmittance for each wavelength varying with the number of the dielectric layers, the refractive index of the dielectric layer, and the thickness of the dielectric layer.

Figure 4:
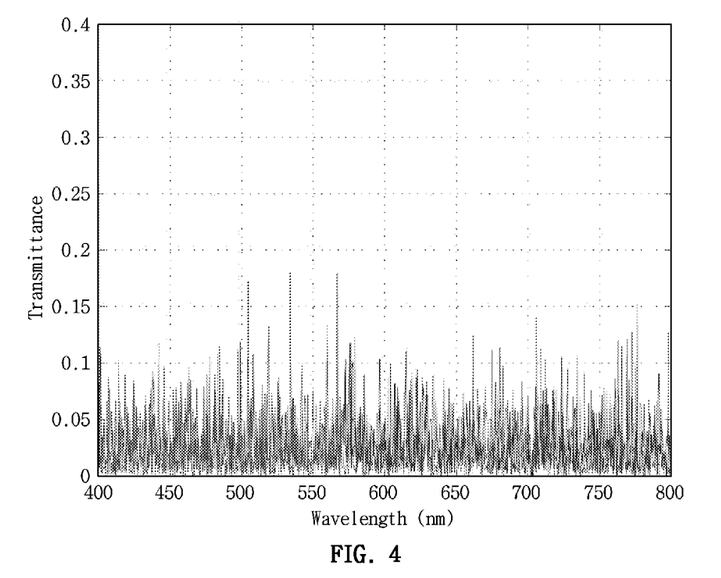
FIG. 4 is a graph to explain a transmittance function of a random transmittance filter.

FIG. 4 is a graph to explain a random transmittance function of three random transmittance filters according to the embodiment. The random transmittance filter suggested with the characteristic of FIG. 4 may be provided through various methods such as a diffraction lattice-based method and a thin-film optical filter-based method. Regarding the characteristics of the random transmittance filter, multiple peak values, which are densely formed, are provided within a predetermined wavelength band, and a low autocorrelation function (ACF) is represented.

For the experiment, the graph shown in FIG. 4 may be randomly provided through Equation 15.

$$T = t_1^2 + t_2^2 \quad \text{Equation 15}$$

In Equation 15, T is a Chi-square random variable having two freedom degrees, and $t_1$ and $t_2$ are Gaussian random variables, respectively, and have a mean of 0 and a variance value of v.

Figure 5:
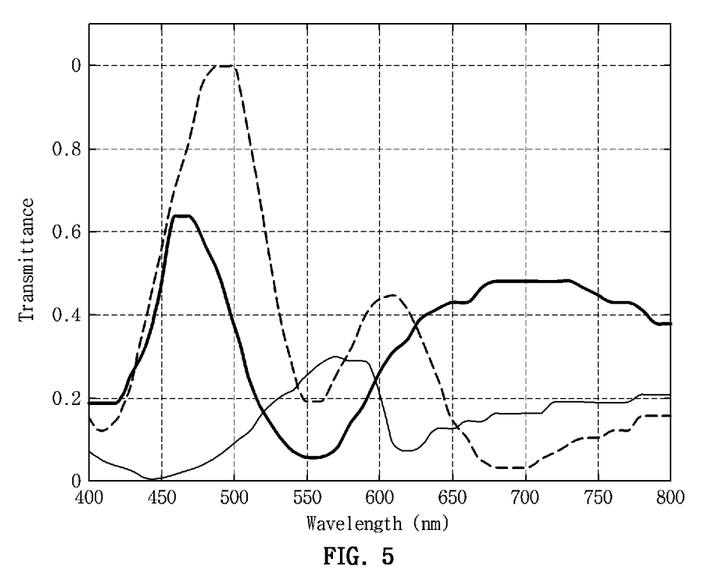
FIG. 5 is a graph to explain a transmittance function of a non-ideal filter.
Figure 6:
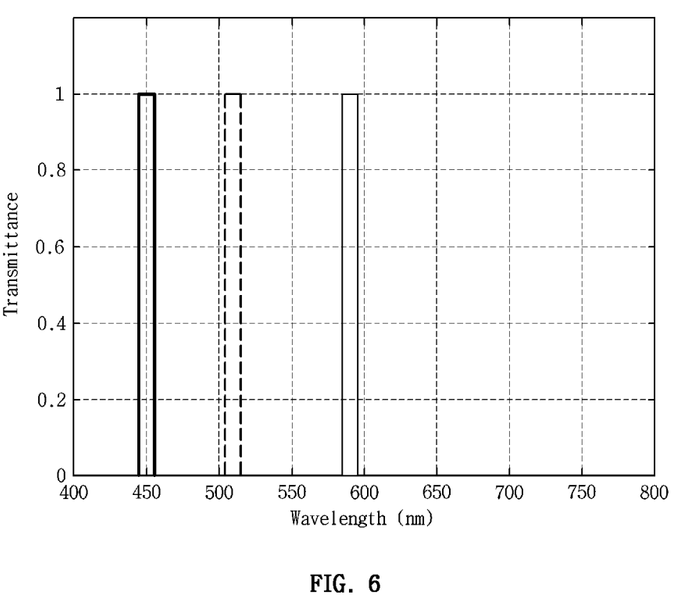
FIG. 6 is a graph to explain a transmittance function of an ideal filter.

The transmittance function of the non-ideal filter corresponding to the random transmittance filter is shown in FIG. 5, and the transmittance filter of an ideal filter is shown in FIG. 6. Meanwhile, in general, most filters are non-ideal filters. The transmittance functions shown in FIGS. 4, 5, and 6 are used to show three filters together for the illustrative purpose, and the transmittance functions are designated to the filters, respectively.

The random transmittance function may be characterized by an autocorrelation function. In detail, the autocorrelation function represents a similarity degree between the intensities of lights detected by the random transmittance function at two different wavelengths. Accordingly, if the autocorrelation function has a waveform that is gently attenuated with a wide width, the transmittance function has a high autocorrelation. If the autocorrelation function has the waveform that is sharply attenuated with a narrow width, the transmittance function has a low autocorrelation. The random transmittance filter of FIG. 4 has the autocorrelation lower than that of the non-ideal filter of FIG. 5.

Regarding the autocorrelation function in association with a spectroscope, if autocorrelation functions represent narrow widths as shown in the random transmittance filter, wavelengths spaced apart from each other beyond the width may be independently detected. In other words, the wavelengths may be independently detected by mutually different filters provided in the optical filter device 110. On the contrary, since the autocorrelation functions represent wide widths in the case of the non-ideal filter, the wavelengths may not be independently detected by mutually different filters provided in the optical filter device 110. Accordingly, the random transmittance filter can acquire much more original spectrum information.

The inventor of the present invention has verified the superior performance of the random transmittance filter through various experiments. Hereinafter, the random transmittance filter having spectrum performance superior to that of the ideal filter or the non-ideal filter according to the related art will be described through several experimental examples.

Experimental Example 1

First, an energy conservation ratio R may be defined as expressed in Equation 16.

$$R = \frac{\|As\|_2^2}{\|s\|_2^2} \qquad \text{Equation 16}$$

In this case, $A=D\Psi$ is defined in Equation 5. In Equation 16, the A represents a sensing matrix, and serves as a factor representing that the original spectrum information s of the optical signal is excellently maintained after passing through the optical filter, as the energy conservation ratio R gradually approximates 1.

As another factor, an MSE between an estimation value and a real value of the original spectrum information s may be used. Hereinafter, the details of the procedure of finding the MSE will be described. Equation 5 may be expressed as $y=A_k s_k+w$. In this case, $s_k$ represents a vector including the intensity value of the spectral component of s. Then, the equation may be solved only by estimating $s_k$ from the output signal y. An oracle estimator is employed as an estimator, so that the $s_k$ can be estimated from the output signal y through a typical least square method. The least MSE of the oracle estimator may be named a genie-aided MSE (g.MSE). Naturally, another type of an MSE may be employed.

In detail, the g.MSE is given as expressed in Equation 17.

$$g.MSE(A, \sigma^2, K) \triangleq \mathbb{E}\big[\|(x-\tilde{x})\|_2^2\big] = \qquad \text{Equation 17}$$
$$\mathbb{E}[e_x^T e_x] = tr(C_z) = tr\big(\sigma^2 G_k (A_k^T A_k)^{-1} G_k^T\big)$$

In this case, K represents the number of non-zero values in the sparse vector s, and σ represents a standard deviation. The g.MSE represents the difference between the estimation value and the real value. Since the g.MSE has a smaller value, a filter represents excellent performance.

When the values of N and K are given, the correlation between the g.MSE and the energy conservation ratio R may be expressed on the 2D graph. In this case, the g.MSE is expressed in the unit of dB, and the energy conservation ratio R has no dimension.

On the assumption that N=240, M=40, and K=2, the random transmittance filter shown in FIG. 4 is compared with the non-ideal filter shown in FIG. 5. Since K=2, and the resolution is to distinguish between peak values of two signals, sparse signals adjacent to each other are selected. In this case, since N=240, the total 239 positions (positions of spectrum information of the non-zero sparse signal) may be represented as a support set of the signal s on the graph of the g.MSE and the energy conservation ratio R. In this case, SNR is 40 dB.

Figure 7A:
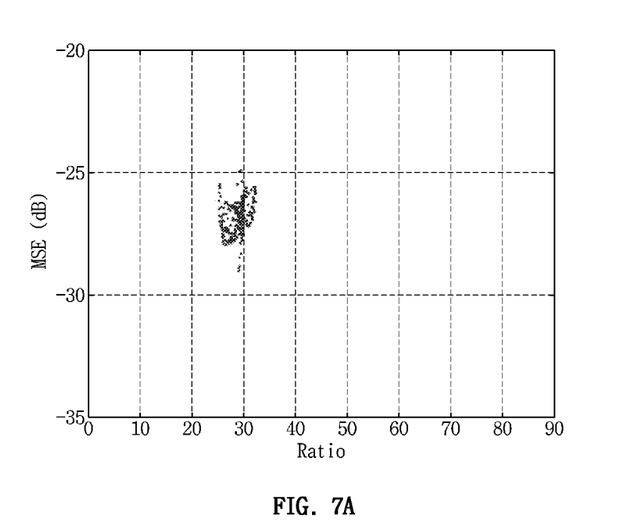
FIG. 7 illustrates graphs representing a genie-aided MSE as a function of an energy conservation ratio under the environment of experimental example 1.
Figure 7B:
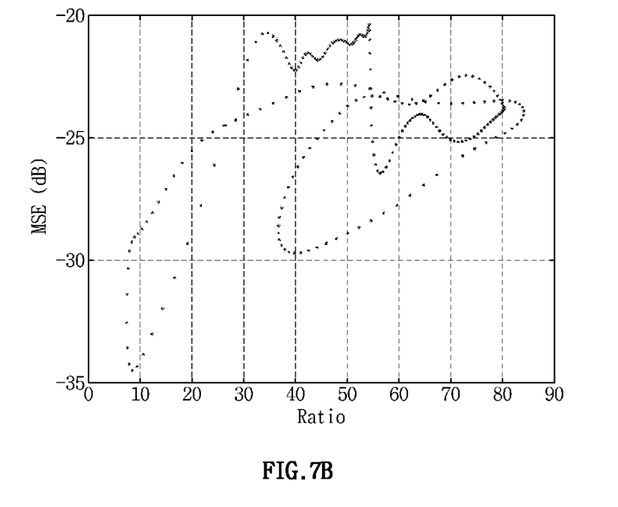

FIG. 7 is a graph showing experimental example 1, (A) of FIG. 7 shows a graph when the random transmittance filter is used, and (B) of FIG. 7 shows a graph when the non-ideal filter is used. Referring to FIG. 7, when comparing with the non-ideal filter, the energy conservation ratio R has lower deviation from a mean value. In other words, values of the energy conservation ratio R are concentrated, which means that the measurement value of the original spectrum of the optical signal may be incorrect when the original spectrum is related to a specific signal belonging to the support set in the case of the non-ideal filter.

Further, in the case of the random transmittance filter, all g.MSEs are less than −24.9 dB. On the contrary, in the case of the non-ideal filter, the g.MSEs are represented to −20.4 dB. Accordingly, the random transmittance filter represents excellent performance.

Experimental Example 2

Experimental example 1 employs the case that K=2 and two spectral components exist. However, in the case of various industrial fields in which oil leakage occurs, at least three spectral components generally exist instead of two spectral components. Experimental example 2 is performed in relation to the original spectrum information of the light source represented with at least three spectral components, that is, at least three peak values.

In this case, $$\Delta\lambda_N = \frac{W_\lambda}{N}$$

represents the interval between samples of the input signal x. In addition, $W_\lambda$ is a wavelength band for the spectrum. The least interval value between the samples becomes the highest resolution that may be acquired from the spectroscopic apparatus. Therefore, as an N value is increased, high resolution can be realized. However, the N value has a limitation.

In the case of mutually different optical filters under the condition, it is determined if the g.MSE satisfies a predetermined value (variable δ) or less in the state that N, M, K, G, and $\sigma^2$ are set to constant values in order to find $\Delta\lambda_{min}$. Then, if the g.MSE satisfies the predetermined value (variable δ) or less, it is determined again if the g.MSE satisfies the predetermined value (variable δ) or less while increasing the N value. Thereafter, the procedure is repeatedly performed until the greatest N value ($N_{max}$) is found, and the found greatest N value ($N_{max}$) becomes $\Delta\lambda_{min}$. In this case, the variable δ value may be arbitrarily selected by a user. The N value may be increased from the value of M. The variable δ may be defined the allowable maximum g.MSE.

The procedure may be expressed in Equation 18.

$$N_{max} := \max\{N \in |M, M+1, \ldots| : Pr(g.MSE \le \delta) \ge \rho\} \quad \text{Equation 18}$$

$$\Delta\lambda_{min} := \frac{W_\lambda}{N_{max}}$$

In Equation 18, the Pr{g.MSE≤δ} refers to a probability that the g.MSE becomes equal to or less than the predetermined value (variable δ). In addition, a variable ρ may be selected as a random value between 0 and 1, and the Pr{g.MSE≤δ} may vary with the variable ρ. If the variable ρ is 0.95, 95% of all possible support sets must be less than the variable δ.

One status is provided for the illustrative purpose. In detail, if three non-zero components (that is K=3) exist for the signal s, M=40, and N=80. In this case, if $N_{max}=N$, $$\Delta\lambda_{min} = \frac{W_\lambda}{80}$$

is obtained. In this case, if the g.MSE and the conservation ratio R are expressed on the graph with respect to the three spectral components, the number of cases are 83,160 from $_{80}C_3$. The cases are shown in the form of a graph in FIG. 8.

Figure 8A:
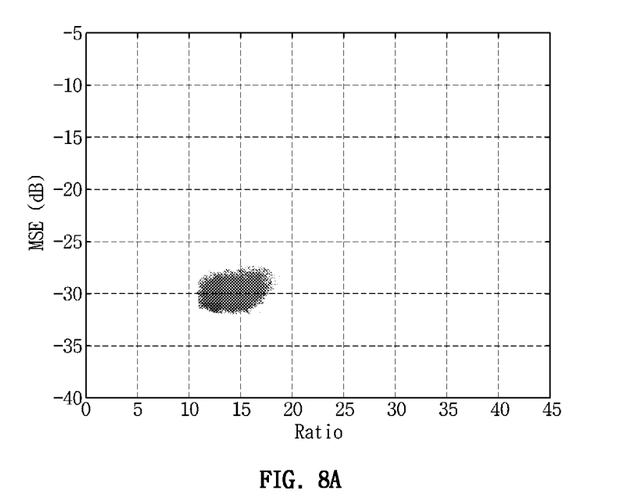
FIG. 8 illustrates graphs representing a genie-aided MSE as a function of an energy conservation ratio under the environment of experimental example 2.
Figure 8B:
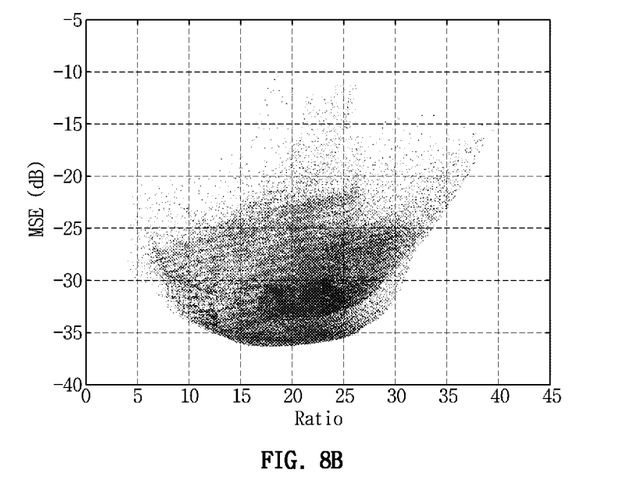

Referring to FIG. 8, (A) shows the case that the random transmittance filter is used, and (B) shows the case that the non-ideal filter is used. Referring to FIG. 8, when the variable δ is −25 dB, Pr{g.MSE≤δ} is 100% in the case of the use of the random transmittance filter. In this case, the highest resolution can be obtained regardless of the position of the spectral component. Meanwhile, in the case of the non-ideal filter, Pr{g.MSE≤δ} is only 78.08% (64,143 of 82,160). Therefore, in the case of the non-ideal filter, the resolution can be ensured only with respect to 78.08%.

Accordingly, in order to satisfy the condition with respect to all possible positions of the original spectral components of the optical signal, the value of N must be lowered, so that the resolution may be degraded.

Example 3

Two optical filter devices 110 are provided by collecting 40 random transmittance filters and 40 non-ideal filters (M=40) representing the waveforms of the graphs shown in FIGS. 4 and 5. The digital signal processing unit 140 employs an L1 norm minimization algorithm shown in FIGS. 2 and 3. The transmittance function of each filter is allocated with a visible wavelength band of 400 nm to 800 nm.

Prior to detailed comparison, when an optical filter device manufactured with the ideal filter is used, the resolution of $$\Delta\lambda_N = \frac{400 \text{ nm}}{40} = 10 \text{ nm}$$

can be obtained without the digital processing unit. In other words, the resolution becomes 10 nm.

Hereinafter, the cases that optical filter devices manufactured with the random transmittance filter and the non-ideal filter, respectively, are used will be described.

Figure 9:
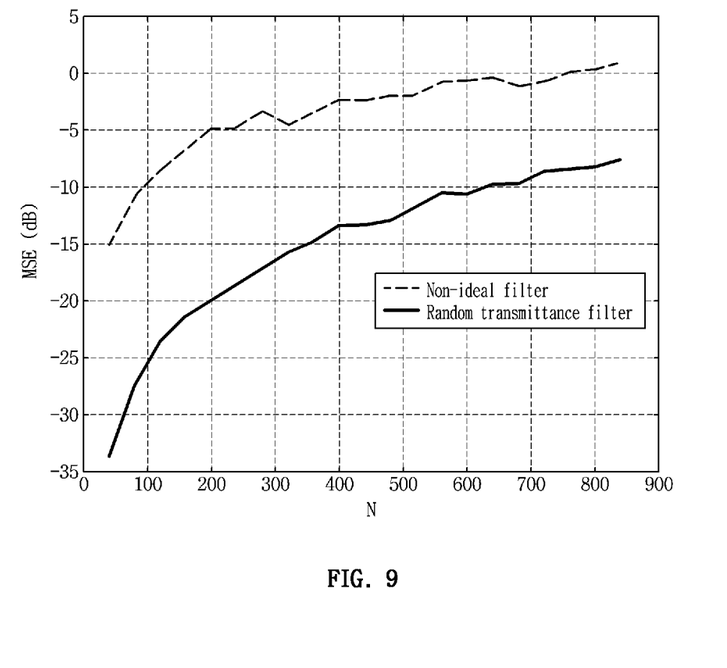
FIG. 9 is a graph showing the correlation between a 95-percentile MSE and N under the environment of experimental example 3.

In detail, the value of N starts from 40, which is equal to the value of M, as an initial value and is gradually increased to a multiple of 40. In addition, when the number (K) of components of a signal s necessary to analyze a sparse signal is set to 3, the number of possible positions (support set) is given as NC3 in which three combinations may be selected from the given N. In this case, 10,000 are randomly extracted from the result of NC3 and reflected on the experiment. A g.MSE is found with respect to each support set, and a variable ρ is set to 0.95. FIG. 9 is a graph representing the correlation between 95-percentile MSE and N.

Referring to FIG. 9, when the variable δ is −10 dB, $N_{max}$ is 93 in the case of the non-ideal filter, and 632 in the case of the random transmittance filter. Therefore, the resolution becomes $$\Delta\lambda_{min} = \frac{W_\lambda}{N_{max}} = \frac{400 \text{ nm}}{93} = 4.3 \text{ nm}$$

in the case of the non-ideal filter, and becomes $$\Delta\lambda_{min} = \frac{400 \text{ nm}}{632} = 0.63 \text{ nm}$$

in the case of the random transmittance filter, which represents 2.3 times and 15.9 times higher than 10 nm (the resolution of the ideal filter), respectively, without the digital processing unit. In addition, when comparing the non-ideal filter with the random transmittance filter, the random transmittance filter represents the resolution improved by 7 times higher than that of the non-ideal filter.

Experimental Example 4

In experimental example 4, light sources representing peak values of 604.6 nm, 633.8 nm, and 658.04 nm as the information of the optical signal incident on the optical filter device 110 are used, and the cases of the random transmittance filter and the non-ideal filter are compared with each other. In this case, K=3, M=40, and N=480.

Figure 10:
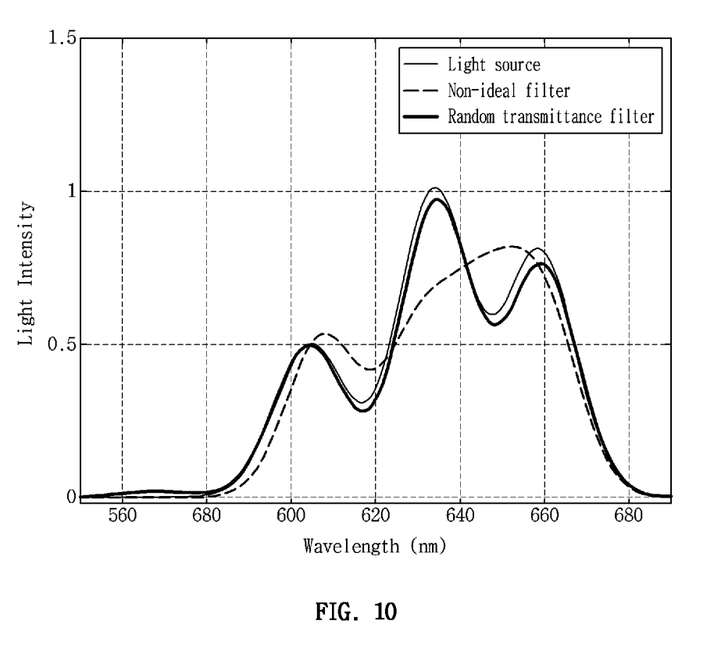
FIG. 10 is a graph showing an experimental result according to experimental example 4.

FIG. 10 is a graph showing an experimental result according to experimental example 4. Referring to FIG. 10, when the random transmittance filter is used, the original spectrum information of the optical signal is almost found. However, when the non-ideal filter is used, a peak value is not represented, and only two pieces of spectrum information are found.

Accordingly, when the random transmittance filter is used, higher resolution is represented and the accuracy of the spectroscopic apparatus is improved as compared with those of a typical non-ideal filter.

According to the present invention, in order to solve an insufficient linear equation, a method based on an L1 norm minimization algorithm using the sparse nature of the signal is used. However, various digital signal processing methods to find the solutions of the insufficient linear equation may be employed within the inventive concept of the present invention.

The inventive concept of the present invention is not limited to the above limitation. Those skilled in the art can easily suggest various embodiments, modifications, and equivalents falling within the scope of the present invention by adding, modifying, and deleting components.

INDUSTRIAL APPLICABILITY

According to the present invention, many pieces of information can be extracted from the original spectrum of the optical signal using the random transmittance filter. Accordingly, the original spectrum of the optical signal can be recovered with higher resolution. In addition, the original spectrum of the optical signal can be recovered with the higher reliability and accuracy.

The invention claimed is:

1. A spectroscopic apparatus comprising:
an optical filter device comprising at least two filters to filter incident light;
an optical sensor device comprising at least two optical sensors corresponding to the at least two filters to convert the filtered light into a charge and to output the charge; and
a digital signal processing unit that digitally processes an output signal from the optical sensor device to recover spectrum information of the incident light,
wherein at least one of the at least two filters is a random transmittance filter,
wherein the at least two filters are uncorrelated,
wherein the output signal is expressed by insufficient linear equation,
wherein the digital signal processing unit recovers the spectrum information of the incident light by applying a L1 norm minimizing algorithm to the output signal expressed by insufficient linear equation,
wherein the random transmittance filter has an autocorrelation function which represents a similarity degree between the intensities of lights detected by the random transmittance function at two different wavelengths,
wherein if the autocorrelation functions represent narrow widths in the random transmittance filter, wavelengths spaced apart from each other beyond the width are independently detected.

2. The spectroscopic apparatus of claim 1, wherein transmittance of the random transmittance filter has a random peak value throughout a whole target wavelength band.

3. The spectroscopic apparatus of claim 1, wherein transmittance of the random transmittance filter rapidly varies.

4. The spectroscopic apparatus of claim 1, wherein the random transmittance filter is a substrate provided therein with a plurality of elongated grooves spaced apart from each other.

5. The spectroscopic apparatus of claim 4, wherein the elongated grooves form a diffraction lattice.

6. The spectroscopic apparatus of claim 4, wherein 500 to 1000 elongated grooves are provided at an interval of 1 mm.

7. The spectroscopic apparatus of claim 4, wherein transmittance of the random transmittance filter is adjusted according to wavelengths as a cycle and a height of the elongated grooves vary.

8. The spectroscopic apparatus of claim 1, wherein a thin dielectric layer is laminated on the random transmittance filter.

9. The spectroscopic apparatus of claim 1, wherein the digital signal processing unit performs signal processing based on an L1 norm minimization algorithm employing a sparse nature of a signal.

10. The spectroscopic apparatus of claim 1, wherein the random transmittance filter has a low autocorrelation function.

11. A spectroscopic method comprising:
filtering incident light by each of at least two filters; and
converting the light filtered by each of the at least two filters into an electrical signal by using an optical sensor device to output the electrical signal,
wherein the light passing through at least one of the at least two filters is randomly filtered in the filtering of the incident light by each of the at least two filters,
wherein the at least two filters are uncorrelated,
wherein the output signal is expressed by insufficient linear equation,
wherein the digital signal processing unit recovers the spectrum information of the incident light by applying a L1 norm minimizing algorithm to the output signal expressed by insufficient linear equation,
wherein the random transmittance filter has an autocorrelation function which represents a similarity degree between the intensities of lights detected by the random transmittance function at two different wavelengths,
wherein if the autocorrelation functions represent narrow widths in the random transmittance filter, wavelengths spaced apart from each other beyond the width are independently detected.

12. The spectroscopic method of claim 11, wherein all lights passing through the at least two filters are randomly filtered.

13. The spectroscopic method of claim 11, wherein digital signal processing is performed based on an L1 norm minimization algorithm employing a sparse nature of a signal.

14. The spectroscopic method of claim 11, further comprising recovering spectrum information of the incident light by performing digital signal processing with respect to an output of the optical sensor device.

15. A spectroscopic apparatus comprising:
an optical filter device comprising at least two filters to filter incident light; and
an optical sensor device comprising at least two optical sensors corresponding to the at least two filters to convert the filtered light into a charge and to output the charge,
wherein at least one of the at least two filters is a random transmittance filter,
wherein the at least two filters are uncorrelated,
wherein the output signal is expressed by insufficient linear equation,
wherein the digital signal processing unit recovers the spectrum information of the incident light by applying a L1 norm minimizing algorithm to the output signal expressed by insufficient linear equation,
wherein the random transmittance filter has an autocorrelation function which represents a similarity degree between the intensities of lights detected by the random transmittance function at two different wavelengths,
wherein if the autocorrelation functions represent narrow widths in the random transmittance filter, wavelengths spaced apart from each other beyond the width are independently detected.

16. The spectroscopic apparatus of claim 15, wherein transmittance of the random transmittance filter has a random peak value in at least a portion of a target wavelength band.

17. The spectroscopic apparatus of claim 15, wherein the random transmittance filter is a substrate provided therein with a plurality of elongated grooves spaced apart from each other.

18. The spectroscopic apparatus of claim 15, wherein a thin dielectric layer is laminated on the random transmittance filter.

* * * * *